United States Patent
Suringa

(10) Patent No.: US 7,904,305 B2
(45) Date of Patent: Mar. 8, 2011

(54) SYSTEM AND METHOD FOR VERIFYING THE ACCURATE PROCESSING OF MEDICAL INSURANCE CLAIMS

(76) Inventor: Dirk W. R. Suringa, Tampa, FL (US)

(*) Notice: Subject to any disclaimer, the term of this patent is extended or adjusted under 35 U.S.C. 154(b) by 1362 days.

(21) Appl. No.: 11/118,281

(22) Filed: Apr. 29, 2005

(65) Prior Publication Data
US 2006/0247947 A1    Nov. 2, 2006

(51) Int. Cl.
*G06Q 10/00* (2006.01)
(52) U.S. Cl. .............................................. 705/2
(58) Field of Classification Search .................. 705/2, 3, 705/4
See application file for complete search history.

(56) References Cited

U.S. PATENT DOCUMENTS

| | | | |
|---|---|---|---|
| 4,858,121 A | 8/1989 | Barber et al. | |
| 5,930,759 A | 7/1999 | Moore et al. | |
| 6,208,973 B1* | 3/2001 | Boyer et al. | 705/2 |
| 6,341,265 B1 | 1/2002 | Provost et al. | |
| 6,343,271 B1 | 1/2002 | Peterson et al. | |
| 6,453,297 B1 | 9/2002 | Burks et al. | |
| 7,194,416 B1* | 3/2007 | Provost et al. | 705/4 |
| 2003/0083906 A1* | 5/2003 | Howell et al. | 705/4 |
| 2004/0215494 A1* | 10/2004 | Wahlbin et al. | 705/4 |
| 2005/0261944 A1 | 11/2005 | Rosenberger | |

* cited by examiner

*Primary Examiner* — Gerald J. O'Connor
*Assistant Examiner* — Edward Winston
(74) *Attorney, Agent, or Firm* — Adriana S. Luedke

(57) ABSTRACT

In a system and method for verifying the accurate processing of medical insurance claim data by one or more health insurance companies, a healthcare provider enters claim data into a provider terminal. The provider terminal transmits the claim data to an insurance claim processor that processes claims for payment on behalf of one or more health insurance companies. Upon receipt of the processed claim data from the insurance claim processor, the provider terminal compares the processed claim data with the claim data originally submitted to the insurance claim processor and generates comparison data indicating whether the original claim data has been processed in accordance with predetermined claim processing rules. The health care provider terminal may also generate and retransmit revised claim data when the processed claim data has not been processed in accordance with the predetermined processing rules or within a defined period of time.

14 Claims, 5 Drawing Sheets

SYSTEM AND METHOD FOR VERIFYING THE ACCURATE PROCESSING OF MEDICAL INSURANCE CLAIMS

FIELD OF THE INVENTION

The present invention relates to a system and method for verifying the accurate processing of medical insurance claims prepared and filed by health care providers for payment by medical insurance companies. The present invention further relates to a system and method for verifying the accuracy of medical insurance claims prior to submission by health care providers to medical insurance companies.

BACKGROUND OF THE INVENTION

The processing of medical insurance claims generated when health care providers ("providers") perform services for patients is facilitated by computerized networks. In general, when a provider treats a patient, the provider enters certain medical insurance claim data into a computer using software programs designed for this specific use. The claim data entered into the computer is transmitted to one or more medical insurance companies. The medical insurance companies process the claims, send processed claim information back to the provider, and send financial compensation for the services rendered by the provider.

Medical insurance claim data entered into a computer by a provider generally include several types of codes, which may be, for example, numeric or alphanumeric in format. Each code represents an aspect of a provider's treatment of a patient. Types of codes include examination codes, diagnostic codes, procedure codes and supply codes. Examination codes represent the type of examination performed by a provider on a patient. Diagnostic codes represent the diagnosis(es) made by the provider concerning the patient's condition, and the procedure codes indicate what services were performed by the provider in order to treat the patient. Supply codes represent supplies used to treat the patient, such as surgical trays, medications, IV supplies, etc. A single visit by a patient to a provider may result in one or more examinations of body systems and/or body parts, one or more diagnoses, one or more procedures, and/or use of one or more supplies, each of which is represented by a code when a medical insurance claim is created and submitted to an insurance company. Moreover, for each diagnostic code, there are defined allowable procedure codes, and for each procedure code, there are defined allowable supply codes. Thus, the codes reflect that only certain procedures are appropriate in treating a given diagnosis, and that only certain supplies are appropriate for performing certain procedures.

One commonly used collection of examination, diagnostic, procedural and supply codes is published by the American Medical Association (AMA), which regularly updates and publishes its codes. The AMA also assigns point values to each examination, procedure, and supply code. These point values are used in processing medical insurance claims as described in detail below.

Before submitting claims to a medical insurance company, a provider negotiates a contract with the insurance company that dictates the terms by which the insurance company will reimburse the provider for services performed on patients insured by the insurance company. In the contract, the insurance company defines the reimbursement terms using the point values assigned to each of the AMA procedure and supply codes by assigning a conversion factor that translates the points for each procedure and supply code into a dollar value. Providers may negotiate different conversion factors with different insurance companies. The conversion factor may also vary with geographic location of the provider. In some cases, such as Medicare, the provider does not have any opportunity to negotiate the terms of reimbursement: Medicare's reimbursement terms and conversion factors are fixed.

For purposes of illustrating the existing system for processing and reimbursement of medical insurance claims, an exemplary medical insurance claim may be submitted to an insurance company as follows:

Date of Service
Patient Identification Number
Examination Code 1
Diagnostic Code 1
   Procedure Code 1
     Supply Code 1
   Procedure Code 2
   Procedure Code 3
Diagnostic Code 2
   Procedure Code 1
   Procedure Code 2
     Supply Code 1

The date of service represents the date on which the patient was seen and treated. The patient's identification number may be the patient's Social Security Number or any other identification number, often assigned by the patient's medical insurance company. The Examination Code indicates that the provider performed a certain type of examination on the patient. The Diagnosis Codes represent the diagnoses made by the provider concerning the patient's condition, the Procedure Codes represent the procedures performed by the provider to treat the patient, and the Supply Codes indicate what supplies were used in performing the corresponding procedures.

When a medical insurance claim is received by a medical insurance company or other medical insurance provider ("the company"), the company processes the claim either automatically or manually. Processed claim data and monetary payment are then sent to the provider, via electronic or paper means.

Processed claim data generated in response to the example claim above should be as follows:

Date of Service
Patient Identification Number
Examination 1—Amount reimbursed ($)
Diagnostic Code 1
   Procedure Code 1—Amount reimbursed ($)
     Supply Code 1—Amount reimbursed ($)
   Procedure Code 2—Amount reimbursed ($)
   Procedure Code 3—Amount reimbursed ($)
Diagnostic Code 2
   Procedure Code 1—Amount reimbursed ($)
   Procedure Code 2—Amount reimbursed ($)
     Supply Code 1—Amount reimbursed ($)

In the existing system of medical insurance claim processing and reimbursement, however, mistakes are very common. It is not unusual for claims to be processed incorrectly or incompletely. For example, the conversion factor used to calculate the amount of money to be reimbursed to the provider may be incorrect, leading to incorrect payments. Also, examination and/or procedural codes may be omitted all together, such that the provider is not paid for examinations and/or procedures performed or supplies used.

These types of mistakes and omissions are difficult to track due to the shear volume of claims involved. A provider may send hundreds of claims on a weekly basis, and manually checking each one to insure proper processing and reimbursement is very burdensome. In addition, the claims must be resubmitted to the insurance company for correct processing, which adds to the burden placed on providers and insurance companies.

Consequently, there is a need for a system for health care providers to use to verify that their insurance claims are being correctly processed and paid, to assist in resubmission of incorrectly processed claims, and to assist in verifying the accuracy of claims prior to submission to the insurance company.

SUMMARY OF THE INVENTION

In view of the drawbacks of the existing system for processing and reimbursing medical insurance claims as described above, the present invention provides a system and method that automatically identify medical health insurance claim processing errors. In particular, in the system and method according to the present invention, processed claim data received from an insurance company is compared with the original medical insurance claim data submitted to the insurance company to verify that each examination, procedural, and/or supply code has been processed and that the monetary amount reimbursed for each supply, procedure and examination matches that amount due under the contract between the provider and the insurance company. The system and method according to the present invention may also automatically resubmit erroneously processed claim data to the medical insurance company until each claim is correctly and completely processed.

The system and method according to the present invention may also check medical insurance claims prior to submission to the insurance company to verify that the diagnostic codes, procedural codes, and supply codes are correctly associated as defined by the AMA or other coding system, thus avoiding the delay and burden imposed on the provider when the claim is returned to the provider for correction before any processing is performed.

Also, the system and method according to the present invention may notify the provider of claims not processed within a given amount of time, for example, 60 or 90 days after submission of the claim. The system and method according to the present invention may further automatically resubmit these unprocessed claims to the insurance company to facilitate processing of the claims.

A system for verifying the accurate processing of medical insurance claims generated by a health care provider in accordance with the present invention includes health care provider terminal with components for inputting medical insurance claim data, a transmitter for transmitting the medical insurance claim data to a medical insurance claim processor, a storage unit for storing the medical insurance claim data and processed claim data received in response to the medical insurance claim data transmitted to the medical insurance claim processor, and a processor for comparing stored medical insurance claim data and the processed claim data to determine whether the medical insurance claim data has been processed in accordance with predetermined processing rules. The processor generates comparison data that indicates whether the processed claim data has been processed in accordance with the predetermined processing rules. If there are errors in the processed claim data, the comparison data also identifies the specific errors in the processed claim data.

The health care provider terminal in accordance with the present invention may also generate revised medical insurance claim data when the processed claim data has not been processed in accordance with the predetermined processing rules and transmit the revised medical insurance claim data to the medical insurance claim processor. Additionally, the health care provider terminal may retransmit the medical insurance claim data to the medical insurance claim processor when the medical insurance claim data has not been processed by the medical insurance claim processor within a defined period of time. The health care provider terminal may also verify the accuracy of treatment data prior to transmitting the medical insurance claim data to the medical insurance claim processor.

A method for verifying the accurate processing of medical insurance claim data generated by a health care provider in accordance with the present invention comprises the steps of inputting and storing medical insurance claim data, transmitting the medical insurance claim data to a medical insurance claim processor, receiving processed claim data generated by the medical insurance claim processor in response to the medical insurance claim data, comparing the stored medical insurance claim data and the processed claim data, and generating comparison data that indicates whether the medical insurance claim data has been processed in accordance with predetermined processing rules. If there are errors in the processed claim data, the comparison data also identifies the specific errors in the processed claim data.

The method according to the present invention may further include the steps of generating revised medical insurance claim data when the processed claim data has not been processed in accordance with the predetermined processing rules and transmitting the revised medical insurance claim data to the medical insurance claim processor.

The method according to the present invention may also include the step of retransmitting the medical insurance claim data to the medical insurance claim processor when the medical insurance claim data has not been processed by the medical insurance claim processor within a defined period of time.

In accordance with the present invention, the predetermined processing rules may be negotiated and agreed to in a contract between the health care provider and the insurance company that operates the medical insurance claim processor. Also, the processed claim data may be received electronically from the medical insurance claim processor or entered into the health care provider terminal by the health care provider. The medical insurance claim data and processed claim data may include patient identification data and treatment data. The processed claim data may include payment data indicating the amount to be paid to the health care provider in response to the medical insurance claim data.

An alternative system for verifying the accurate processing of medical health insurance claims submitted to a medical insurance company by a health care provider in accordance with the present invention includes a device for inputting medical insurance claim data having one or more treatment codes; a transmitter for transmitting the medical insurance claim data to a medical insurance claim processor; a storage device for storing the medical insurance claim data and processed claim data received in response to the medical insurance claim data transmitted to the medical insurance claim processor; and a processor for verifying the accuracy of the treatment codes in the medical insurance claim data using predetermined processing rules prior to transmitting the medical insurance claim data to the medical insurance claim processor. The processor may generate notification data when the medical insurance claim data has not been processed in accordance with the predetermined processing rules.

The foregoing and other features, aspects, and advantages of the present invention will become more apparent from the following detailed description when read in conjunction with the accompanying drawings.

DETAILED DESCRIPTION OF THE PREFERRED EMBODIMENTS

The present invention will now be described with reference to the accompanying drawings, which are provided as illustrative examples of preferred embodiments of the present invention. Notably, the present invention may be implemented using software, hardware or any combination thereof as would be apparent to one of skill in the art.

Figure 1:
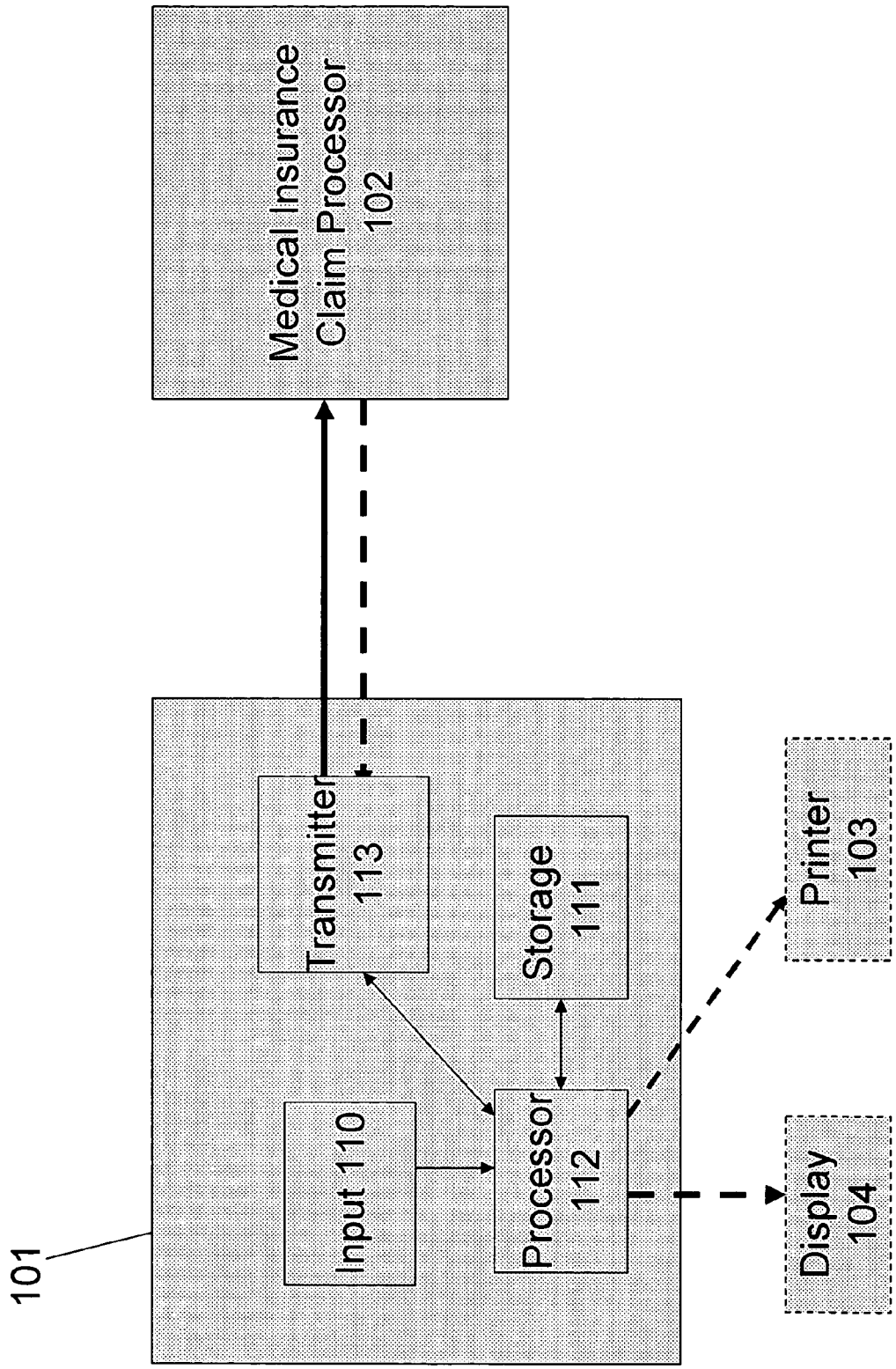
FIG. 1 provides a block diagram of the components of a preferred embodiment of a system for verifying the accurate processing of medical insurance claims in accordance with the present invention.

FIG. 1 depicts a preferred embodiment of a health care provider terminal 101 such as could be found in a doctor's office, health clinic, hospital, dental office, or any other place in which health care services are rendered to patients. With reference to FIG. 1, terminal 101 according to the present invention includes a keyboard, computerized dictation system, or other wired or wireless data input device 110 used to input medical insurance claim data into terminal 101. Medical insurance claim data entered via the input device 110 is stored in a storage device 111, which may be any type of data storage device, such as a hard drive, CD-ROM, DVD, floppy disk, flash memory, or other data storage device as would be apparent to one of skill in the art.

Figure 2:
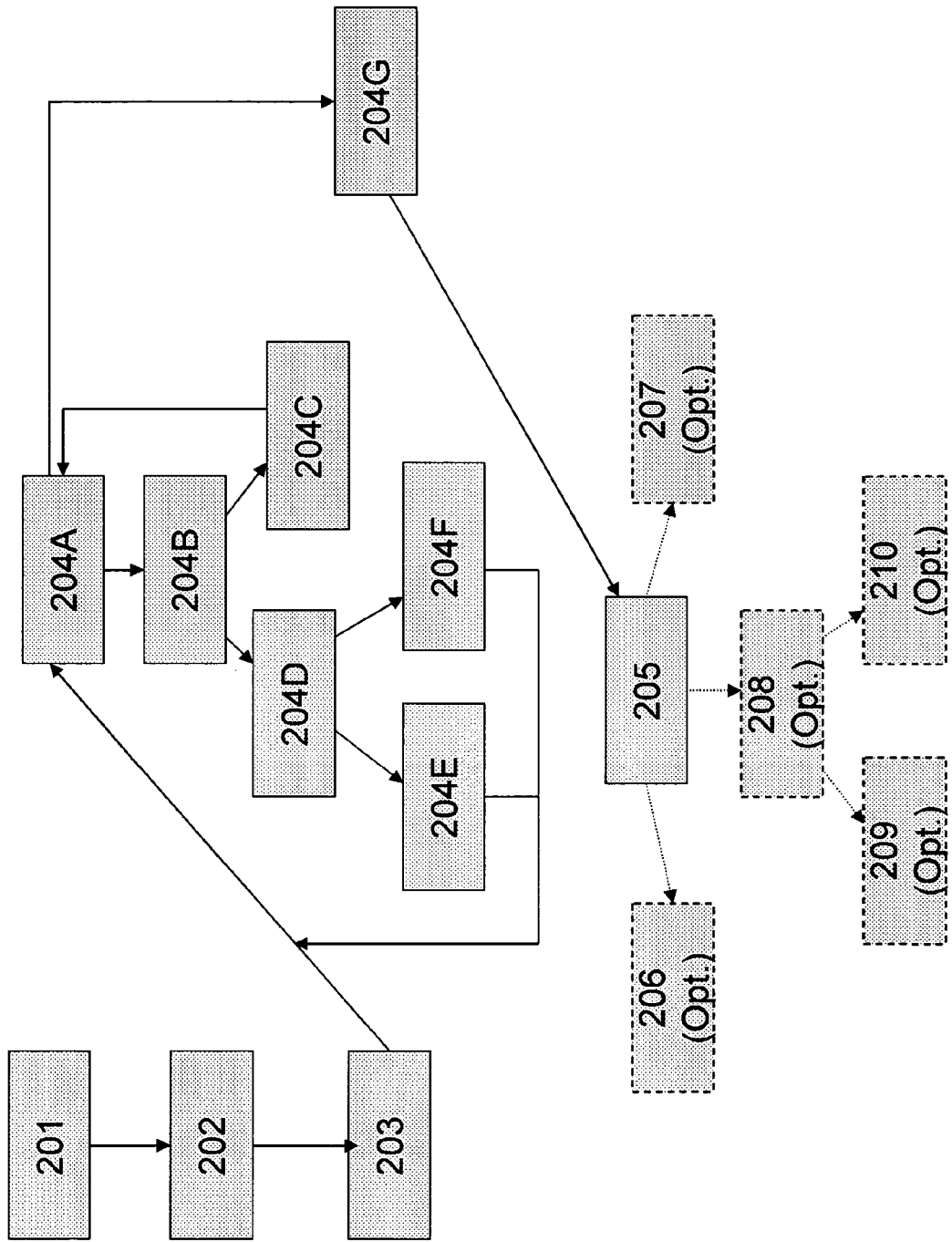
FIG. 2 provides a block diagram of the functionality of a processor that may be used in the health care provider terminal shown in FIG. 1.
Figure 3:
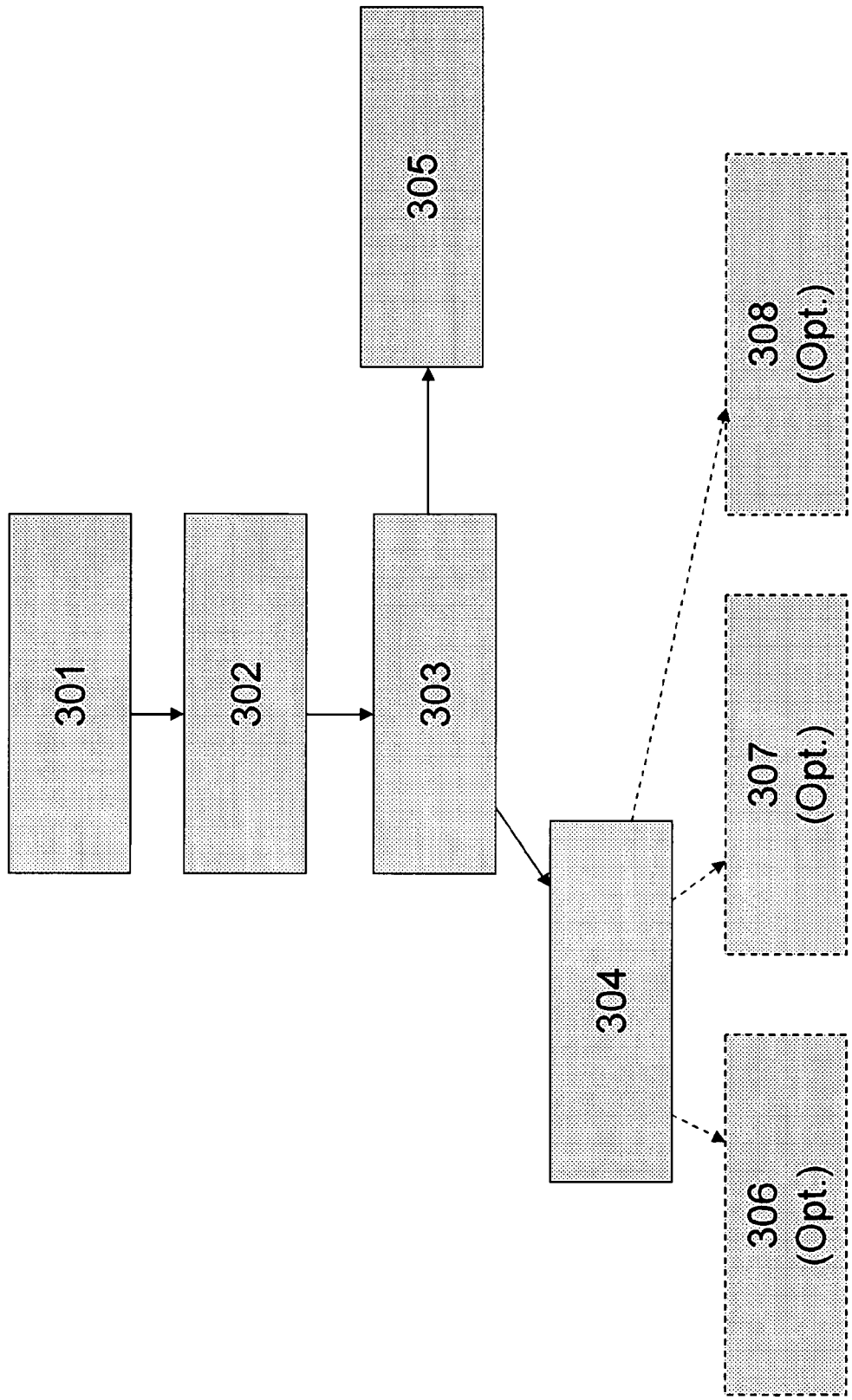
FIG. 3 provides a block diagram of additional functionality of a processor that may be used in the health care provider terminal shown in FIG. 1 in which the processor notifies the health care provider of claims not processed within a defined period of time.
Figure 4:
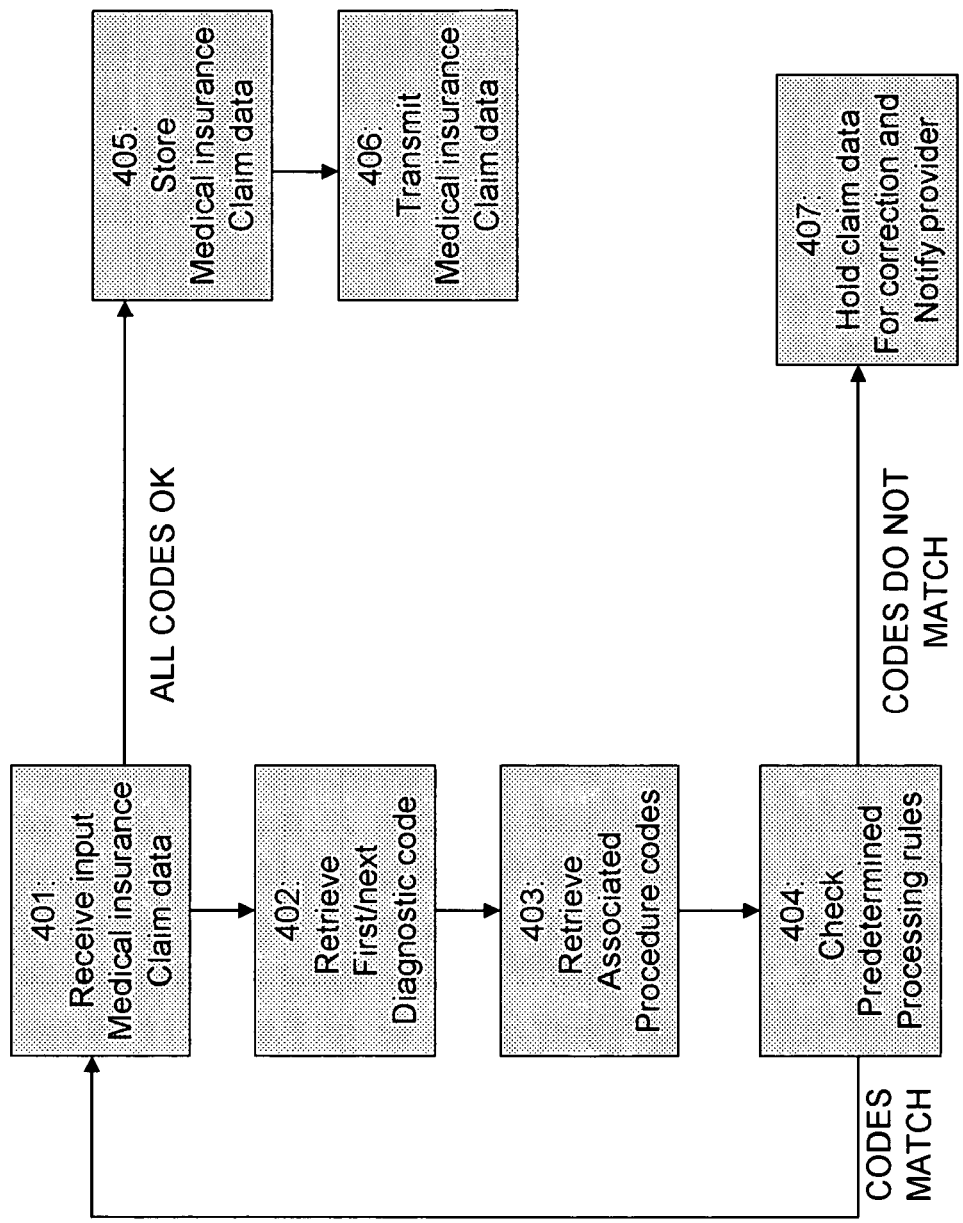
FIG. 4 provides a block diagram of additional functionality of a processor that may be used in the health care provider terminal shown in FIG. 1 in which the processor checks the accuracy of medical insurance claim data prior to its transmission to a medical insurance claim processor.

Terminal 101 also includes a processor 112 that receives medical insurance claim data from input device 110 that facilitates the storage of the data in storage device 111 and processes the data and other data as described below with reference to FIGS. 2-4. Processor 112 also provides the medical insurance claim data to a transmitter/receiver 113 for transmitting and receiving data. Transmitter/receiver 113 may be any type of transmitter/receiver for sending and receiving data, such as a modem coupled to a telephone line, broadband connection, satellite connection, Internet connection, or cable connection, or any other wired or wireless data communication network as would be apparent to one of skill in the art. Transmitter/receiver 113 receives medical insurance claim data from processor 112 and transmits it to a medical insurance claim processor 102, which is operated by a medical insurance company.

In accordance with one embodiment of the present invention, medical insurance claim processor 102 transmits processed claim data back to terminal 101 via transmitter/receiver 113, which provides the processed claim data to processor 112.

In accordance with an alternative embodiment of the present invention, processed claim data is received by the health care provider in paper or other form and is entered into terminal 101 by the health care provider using input device 110.

Once the processed claim data is received by terminal 101, processor 112 retrieves from storage 111 the medical insurance claim data corresponding to the processed claim data and compares the medical insurance claim data to the processed claim data in order to determine whether the medical insurance claim data was accurately processed by medical insurance claim processor 102 in accordance with predetermined processing rules. This comparison process performed by processor 112 and the predetermined processing rules are described in further detail below with reference to FIG. 2.

Based upon the comparison of the stored medical insurance claim data stored in storage 111 to the processed claim data received from the medical insurance claim processor 102, processor 112 generates comparison data. If the medical insurance claim data submitted to the medical insurance claim processor by terminal 101 has been correctly processed by the medical insurance claim processor 102 in accordance with the predetermined processing rules, processor 112 generates comparison data to indicate that the claim data has been processed such that no further processing is required. If the medical insurance claim data submitted to the medical insurance claim processor by terminal 101 has not been correctly processed by the medical insurance claim processor 102 in accordance with the predetermined processing rules, processor 112 generates comparison data to indicate that the claim data has been incorrectly processed and identify the specific processing errors. The comparison data may be stored in storage 111, and/or optionally sent to a printer 103 or display device 104, such as a monitor, coupled to terminal 101.

The predetermined processing rules utilized by processor 112 to perform its comparison of the stored medical insurance claim data and the processed claim data will now be described in further detail. As described above in the Background section, a health care provider negotiates a contract or other binding agreement with a medical insurance company that dictates the terms and conditions under which the medical insurance company will pay the health care provider for rendering health care services to patients insured by the insurance company. For example, under terms of one such contract, the insurance company may agree to award a certain number of value points for each examination and/or procedure performed and each supply used by the health care provider (for example, using the AMA published codes and point values) and then to convert the value points into a dollar value using a conversion factor. This value point and conversion factor claim processing system comprises the predetermined processing rules used by processor 112 to verify the accurate processing of medical insurance claim data submitted by the health care provider to the medical insurance company.

Notably, any type of claim processing and payment system may be programmed into the health care provider terminal 101 within the scope of the present invention.

The comparison process performed by processor 112 will now be described in detail with reference to FIG. 2. First, processor 112 receives processed claim data from transmitter/receiver 113 (step 201). Processor 112 then identifies the processed claim data by retrieving from the processed claim data identification data, such as a claim identification code or a patient identification code and date of service code (step 202). Processor 112 then accesses the corresponding stored medical insurance claim data stored in storage 111 using the identification data retrieved from the processed claim data (step 203). Processor 112 then compares the stored medical insurance claim data with the processed claim data as follows. First, processor 112 identifies the first code (e.g., an examination, procedure or supply code) listed in the stored claim data (step 204A). Processor 112 then checks the processed claim data to determine whether the first processing code is included in the processed claim data (step 204B). If the processed data does not include the first code in the stored claim data, processor 112 stores the omitted first code in storage 111 as an omitted code (step 204C). If the processed data does include the first code, processor 112 checks to see whether the monetary reimbursement/payment amount awarded by the insurance company for the first code in the processed claim data is the correct amount based upon the predetermined processing rules stored in storage 111 (step 204D). If the monetary award awarded for the first code is correct, processor 112 stores the first code in storage 111 as a correctly processed code (step 204E). If the monetary amount awarded for the first code is not correct, processor 112 stores the first code in storage 111 as an incorrectly processed code. Processor 112 also stores in storage 111 the correct amount of payment associated with the first code under the predetermined processing rules and/or the difference between the correct amount of payment and the amount actually paid by the medical insurance claim processor 102 (step 204F).

Processor 112 then searches the stored medical insurance claim data retrieved from storage 111 for the next code (e.g., examination, procedure or supply code) and repeats the process described above with reference to steps 204A-F until all codes in the stored medical insurance claim data have been processed and identified as correctly processed, omitted, or incorrectly processed. When no additional codes are found in the stored medical insurance claim data, the comparison process is complete (step 204G).

Processor 112 then generates and stores in storage 111 comparison data that indicates which of the codes listed in the medical insurance claim data have been correctly processed, which have been omitted, and which have been incorrectly processed as described above with reference to steps 204A-E (step 205).

For example, a medical insurance claim may be entered by a health care provider into terminal 101 as follows:
Claim ID ABCD
Date of Service Oct. 1, 2004
Examination Code 1
Diagnostic Code 1
   Procedure Code 1
   Supply Code 1
   Procedure Code 2
   Procedure Code 3
Diagnostic Code 2
   Procedure Code 1
   Procedure Code 2
   Supply Code 1
Corresponding processed claim data received from medical insurance claim processor 102 may be received as follows:
Claim ID ABCD
Date of Service Oct. 1, 2004
Examination Code 1—$50
Diagnostic Code 1
   Procedure Code 1—$25
   Supply Code 1—$6
   Procedure Code 2—$10
Diagnostic Code 2
   Procedure Code 1—$15
   Procedure Code 2—$3

In response to this processed claim data, processor 112 may generate the following comparison data:
Claim ID ABCD
Examination Code 1—$50 correct
Diagnostic Code 1
   Procedure Code 1—$25 correct
   Supply Code 1—$6 correct
   Procedure Code 2—$10 incorrect (−$5)
   Procedure Code 3—omitted
Diagnostic Code 2
   Procedure Code 1—$15 correct
   Procedure Code 2—$3 incorrect (−$8)
   Supply Code 1—omitted This comparison data indicates that two procedure codes have been incorrectly processed such that the insurance company still owes a total of $13 for these two procedures. Additionally, one procedure code and one supply code were omitted and still need to be processed and paid by the insurance company.

Alternatively, processor 112 may generate the following comparison data in which only the incorrect and omitted data are included:
Claim ID ABCD
Diagnostic Code 1
   Procedure Code 2—$10 incorrect (−$5)
   Procedure Code 3—omitted
Diagnostic Code 2
   Procedure Code 2—$3 incorrect (−$8)
   Supply Code 1—omitted The comparison data may be displayed on a display 103, such as a computer monitor (optional step 206); printed using a printer 104 (optional step 207); or otherwise stored, transmitted, etc. as is useful to the health care provider.

Additionally, in accordance with an alternative embodiment of the present invention, the comparison data is used by processor 112 to create revised claim data (optional step 208). When the comparison data indicates that there are incorrectly processed or omitted codes in the processed claim data, processor 112 creates revised claim data using the identification data from the processed claim data and/or stored claim data. The revised claim data also includes omitted codes from the stored medical insurance claim data and incorrectly processed codes. The difference between the amount paid and the amount due to the health care provider under the predetermined processing rules may also be included in the revised claim data.

For example, in response to the comparison data shown above, the following revised claim data may be generated:
Claim ID ABCD—REVISED
Date of Service Oct. 1, 2004
Diagnostic Code 1
   Procedure Code 2—Paid in part—$5 owed
   Procedure Code 3—Process and pay in full
Diagnostic Code 2
   Procedure Code 2—Paid in part—$8 owed
   Supply Code 1—Process and pay in full The revised claim data is stored by processor 112 in storage 111 (optional step 209). The revised claim data is also transmitted by transmitter/receiver 113 to the medical insurance claim processor 102 for subsequent processing (optional step 210). Processed revised claim data received by the health care provider terminal 101 from the medical insurance claim processor 102 is processed in the same way as all other processed claim data is processed as described above with reference to FIG. 2.

According to an alternative embodiment of the present invention, processor 112 may further be programmed to notify the health care provider when medical insurance claim data transmitted to medical insurance claim processor 102 has not been processed within a predetermined period of time. For example, in one embodiment of the present invention illustrated in FIG. 3, processor 112 of health care provider terminal 101 is programmed to notify the health care provider of any medical insurance claim data transmitted to medical insurance claim processor 102 for which processed claim data has not been received within a predefined period of time from the date of transmission to medical insurance claim processor 102. In order to accomplish this function, medical insurance claim data entered into terminal 101 and stored in storage 111 is assigned a date stamp indicating the date on which the medical insurance claim data is transmitted to medical insurance claim processor 102 (step 301). Similarly, revised claim data may be assigned a date stamp indicating the date on which the revised claim data is transmitted to medical insurance claim processor 102. In accordance with this embodiment of the present invention, medical insurance claim data and revised claim data for which processed claim data has not yet been received is stored as pending claim data in storage 111. Once corresponding processed claim data is received from medical insurance claim processor 102, the stored medical insurance claim data is no longer stored as pending claim data.

Periodically (for example, daily, weekly or otherwise as desired by the health care provider), processor 112 retrieves date stamp data from the pending claim data stored in storage 111 (step 302) and compares the date stamp data of each pending claim with the current date (step 303). If the difference between the date stamp date of a pending claim and the current date is more than a defined number of days (e.g., 60, 90 or any number of days as desired by the health care provider), processor 112 then generates notification data to indicate that the pending claim has been pending for more than the defined period of time (step 304). If the amount of time pending is less than the defined amount of time, the pending claim data remains stored in storage 111 and no notification data is generated (step 305).

Notification data may be optionally displayed on a monitor (optional step 306) or printed (optional step 307). Processor 112 may also be programmed to automatically retransmit claims that have been pending for more than the defined period of time to the medical insurance claim processor 102 (optional step 308). Medical insurance claim data retransmitted in accordance with this embodiment of the present invention include data indicating that the medical insurance claim data is a resubmission of claim data transmitted to the medical insurance claim processor 102 at an earlier date.

In addition to the point values and conversion factors stored in storage 111 as predetermined processing rules, other processing rules may be stored. For example, in accordance with an alternate embodiment of the present invention, additional processing rules are programmed into terminal 101 to indicate whether the diagnostic codes, procedure codes, and supply codes included in medical insurance claim data entered into terminal 101 are correctly associated. As described in the Background section above, each diagnostic code is defined with certain associated procedure codes, and each procedure code is defined with certain associated supply codes. If the procedural or supply codes are not correctly entered, then the claim may be returned to the health care provider terminal 101 for correction without being processed by medical insurance claim processor 102.

To avoid this rejection of medical insurance claim data, processor 112 may process medical insurance claim data prior to its transmission to the medical insurance claim processor 102 as described with reference to FIG. 4. Processor 112 receives medical insurance claim data input into terminal 101 (step 401). Processor 112 then identifies a first diagnostic code from the medical insurance claim data (step 402). Next, processor 112 identifies all procedure codes and supply codes associated with the first diagnostic code (step 403) in the medical insurance claim data. Processor 112 then compares the first diagnostic code with the associated procedure codes and compares the procedure codes with the associated supply codes using the predetermined processing rules to determine whether the diagnostic codes, procedure codes, and supply codes are properly associated (step 404). If the first diagnostic code and corresponding procedure and supply codes are properly associated in accordance with the predetermined processing rules, processor 112 identifies the next diagnostic code from the medical insurance claim data and repeats the process in steps 402-404 described above until all diagnostic codes, procedure codes, and supply codes have been checked. If all diagnostic codes, procedure codes, and supply codes in the medical insurance claim data are properly associated, processor 112 stores the medical insurance claim data (step 405) and transmits the data to the medical insurance claim processor 102 via transmitter 113 (step 406). If any of the diagnostic codes, procedure codes and supply codes in the medical insurance claim data are not properly associated in accordance with the predetermined processing rules, processor 112 generates and stored notification data concerning this error and holds the medical insurance claim data in storage 111 until the claim data is corrected (step 407). Notification data may be displayed on display 103 or printed on printer 104 as desired by the health care provider.

For example, medical insurance claim data may be entered into terminal 101 as follows:

Claim ID ABCD
Date of Service Oct. 1, 2004
Examination Code 1
Diagnostic Code 1
   Procedure Code 1
   Procedure Code 2
   Supply Code 1
   Procedure Code 3
   Supply Code 1
   Procedure Code 4
Diagnostic Code 2
   Procedure Code 1
   Procedure Code 2
   Procedure Code 3
   Supply Code 1
Diagnostic Code 3
   Procedure Code 1
   Procedure Code 2

Corresponding notification data generated by processor 112 may be shown as follows:

Claim ID ABCD
Date of Service Oct. 1, 2004
Examination Code 1—valid
Diagnostic Code 1
   Procedure Code 1—valid
   Procedure Code 2—valid
   Supply Code 1—valid
   Procedure Code 3—not valid Supply Code 1—not valid
Procedure Code 4—not valid
Diagnostic Code 2
Procedure Code 1—valid
Procedure Code 2—valid
Procedure Code 3—valid
Supply Code 1—not valid
Diagnostic Code 3
Procedure Code 1—valid
Procedure Code 2—not valid This notification data indicates that two of the procedure codes and one supply code entered under Diagnostic Code 1, one supply code entered under Diagnostic Code 2, and one of the procedure codes entered under Diagnostic Code 3 are not allowable under the predetermined processing rules and require correction before the medical insurance claim data will be transmitted to the medical insurance claim processor.

Figure 5:
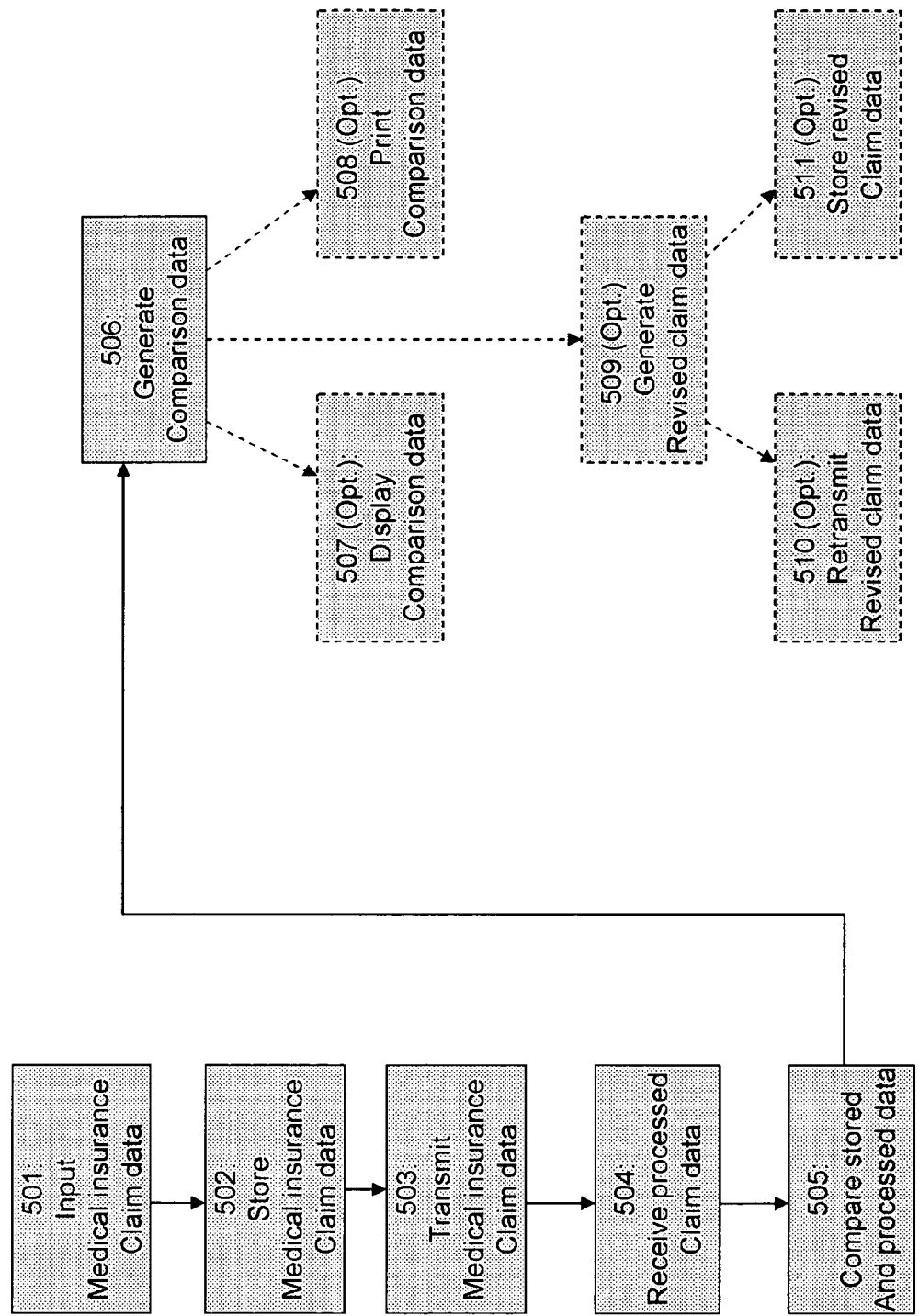
FIG. 5 provides a block diagram of a method for verifying the accurate processing of medical insurance claim data in accordance with the present invention.

A method for verifying the accurate processing of medical insurance claim data in accordance with the present invention will now be described with reference to FIG. 5. In step 501, medical insurance claim data is input into a health care provider terminal. The medical insurance claim data is stored (step 502) and transmitted to a medical insurance claim processor (step 503). The health care provider terminal receives processed claim data from the medical insurance claim processor (step 504) and compares the processed claim data with the stored medical insurance claim data in accordance with the comparison process described in steps 204A-F described above with reference to FIG. 2 (step 505). The health care provider terminal then generates comparison data as described above with reference to step 205 of FIG. 2 (step 506). The health care provider terminal may display (optional step 507) or print (optional step 508) the comparison data. In addition, the health care provider terminal may optionally generate revised claim data as described in detail above with reference to step 208 of FIG. 2 (optional step 509) and store and transmit the revised claim data to the medical insurance claim processor as described above with reference to steps 209-210 of FIG. 2 (optional steps 510 and 511).

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

I claim:

1. A health care provider terminal for verifying the accuracy of health insurance company processing of medical insurance claims generated by a health care provider, comprising:

an electronic input device for receiving from a health care provider medical insurance claim data input into a health care provider terminal, wherein the medical insurance claim data includes one or more insurance claims representing one or more patient services provided by the health care provider;

an electronic data communication device for transmitting the medical insurance claim data from the health care provider terminal to a health insurance company that processes the medical insurance claim data to determine a reimbursement amount payable by the health insurance company to the health care provider for the one or more patient services under at least one health insurance policy, wherein the communication device also receives processed claim data generated by the health insurance company in response to the medical insurance claim data, and wherein the processed claim data includes the reimbursement amount determined by the health insurance company to be payable to the health care provider for the one or more insurance claims in the medical insurance claim data;

an electronic database in the health care provider terminal for storing the medical insurance claim data and the processed claim data; and a computer processor in the health care provider terminal programmed to:

compare the medical insurance claim data submitted to the health insurance company by the health care provider terminal and the processed claim data generated by the health insurance company to determine whether the medical insurance claim data has been processed by the health insurance company in accordance with predetermined processing rules agreed to by the health insurance company and the health care provider, generate comparison data that indicates whether the medical insurance claim data has been processed by the health insurance company in accordance with the predetermined processing rules and identifies any processing errors in the processed claim data, wherein the processing errors include (a) incorrect reimbursement of the health care provider for one or more of the insurance claims in the medical insurance claim data and (b) failure to reimburse the health care provider for one or more of the insurance claims in the medical insurance claim data, and generate revised medical insurance claim data when the comparison data indicates that the medical insurance claim data has not been processed by the health insurance company in accordance with the predetermined processing rules, wherein the revised medical insurance claim data includes the one or more of the insurance claims in the medical insurance claim data for which processing errors are identified; and wherein the communication device resubmits the revised medical insurance claim data from the health care provider terminal to the health insurance company for corrected processing.

2. A health care provider terminal according to claim 1, wherein said processed claim data is received by said health care provider terminal electronically from the health insurance company.

3. A health care provider terminal according to claim 1, wherein the processed claim data is entered into the provider terminal via an electronic input device.

4. A health care provider terminal according to claim 1, wherein said medical insurance claim data and said processed data include patient identification data and treatment data.

5. A health care provider terminal according to claim 4, wherein the computer processor verifies the accuracy of said treatment data using said predetermined processing rules prior to transmitting said medical insurance claim data to the health insurance company.

6. A health care provider terminal according to claim 1, wherein the electronic data communication device retransmits said medical insurance claim data when said medical insurance claim data has not been processed by the health insurance company within a defined period of time.

7. A health care provider terminal according to claim 1, wherein the electronic input device includes a keyboard.

8. A computer-implemented method for verifying the accuracy of health insurance company processing of medical insurance claims generated by a health care provider, comprising:

(a) receiving from a health care provider medical insurance claim data including one or more insurance claims that represent one or more patient services provided by the health care provider into a health care provider terminal using an electronic input device, wherein the medical insurance claim data is stored in an electronic database in the provider terminal;

(b) transmitting via an electronic data communication device the medical insurance claim data from the health care provider terminal to a health insurance company that processes the medical insurance claim data to determine a reimbursement amount payable by the health insurance company to the health care provider for the one or more patient services under at least one health insurance policy, (c) receiving via the communication device processed claim data generated by the health insurance company in response to the transmitted medical insurance claim data, wherein the processed claim data includes the reimbursement amount determined by the health insurance company to be payable to the health care provider for the one or more insurance claims in the medical insurance claim data, and wherein the processed claim data is stored in the electronic database; and (d) using a computer processor in the health care provider terminal programmed to:

compare the medical insurance claim data submitted to the health insurance company by the health care provider terminal and the processed claim data generated by the health insurance company to determine whether the medical insurance claim data has been processed by the health insurance company in accordance with predetermined processing rules agreed to by the health insurance company and the health care provider, generate comparison data that indicates whether the medical insurance claim data has been processed by the health insurance company in accordance with the predetermined processing rules and identifies any processing errors in the processed claim data; wherein the processing errors include (a) incorrect reimbursement of the health care provider for one or more of the insurance claims in the medical insurance claim data and (b) failure to reimburse the health care provider for one or more of the insurance claims in the medical insurance claim data, and generate revised medical insurance claim data when the comparison data indicates that the medical insurance claim data has not been processed by the health insurance company in accordance with the predetermined processing rules, wherein the revised medical insurance claim data includes the one or more of the insurance claims in the medical insurance claim data for which processing errors are identified; and wherein the communication device resubmits the revised medical insurance claim data from the health care provider terminal to the health insurance company for corrected processing.

9. A method according to claim 8, wherein said processed claim data is received electronically from the health insurance company.

10. A method according to claim 8, wherein the processed claim data is entered into the provider terminal via an electronic input device.

11. A method according to claim 8, wherein said medical insurance claim data and said processed data include patient identification data and treatment data.

12. A method according to claim 11, wherein the computer processor verifies the accuracy of said treatment data using said predetermined processing rules prior to transmitting said medical insurance claim data to the health insurance company.

13. A method according to claim 8, wherein the electronic data communication device retransmits said medical insurance claim data when said medical insurance claim data has not been processed by the health insurance company within a defined period of time.

14. A method according to claim 8, wherein the provider terminal displays the comparison data.

* * * * *